Sept. 24, 1940.  C. R. MEITZLER  2,215,666
EXTENSIBLE CHAIR
Filed Feb. 4, 1937   11 Sheets-Sheet 1
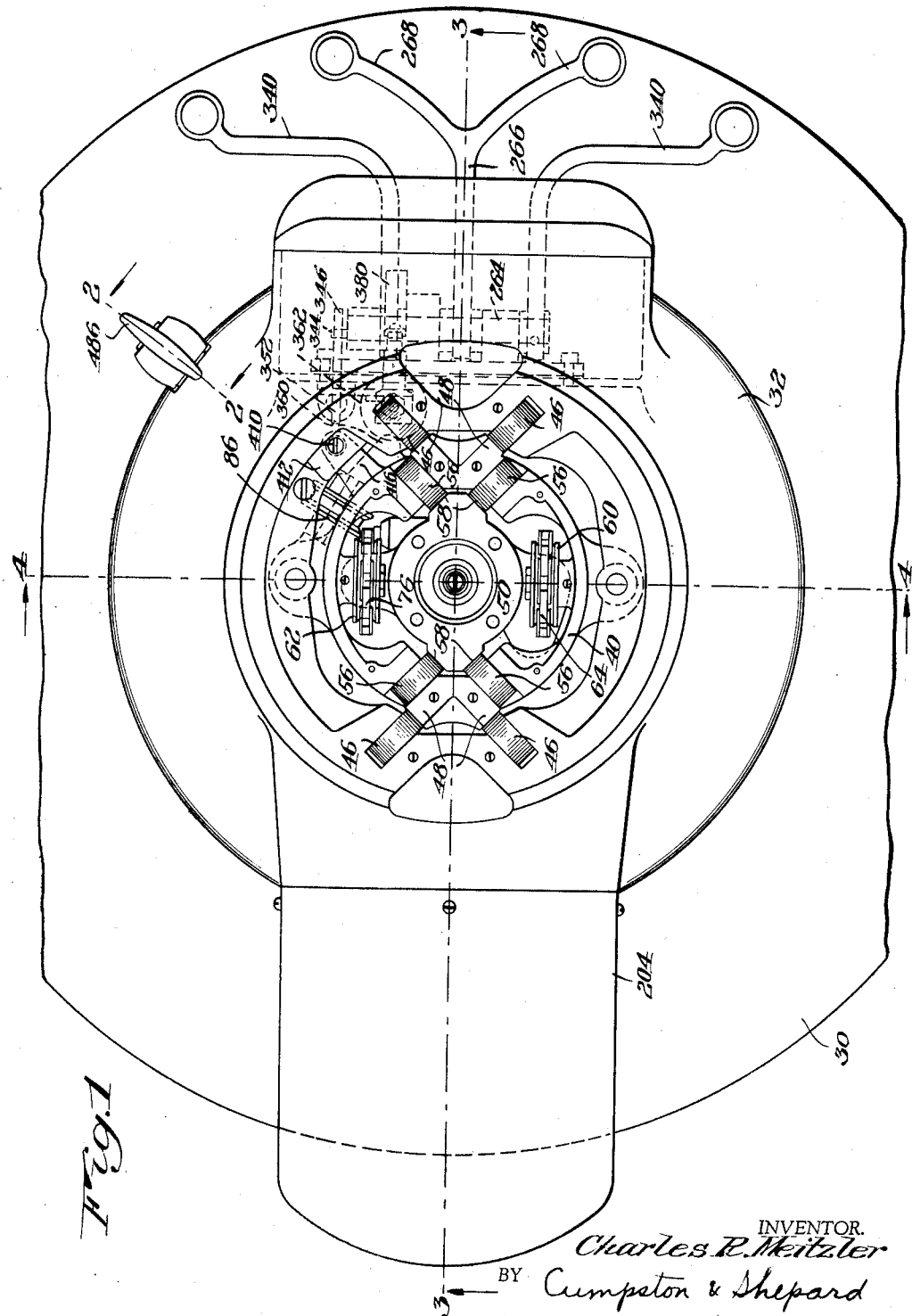
INVENTOR.
Charles R. Meitzler
BY Cumpston & Shepard
his ATTORNEYS

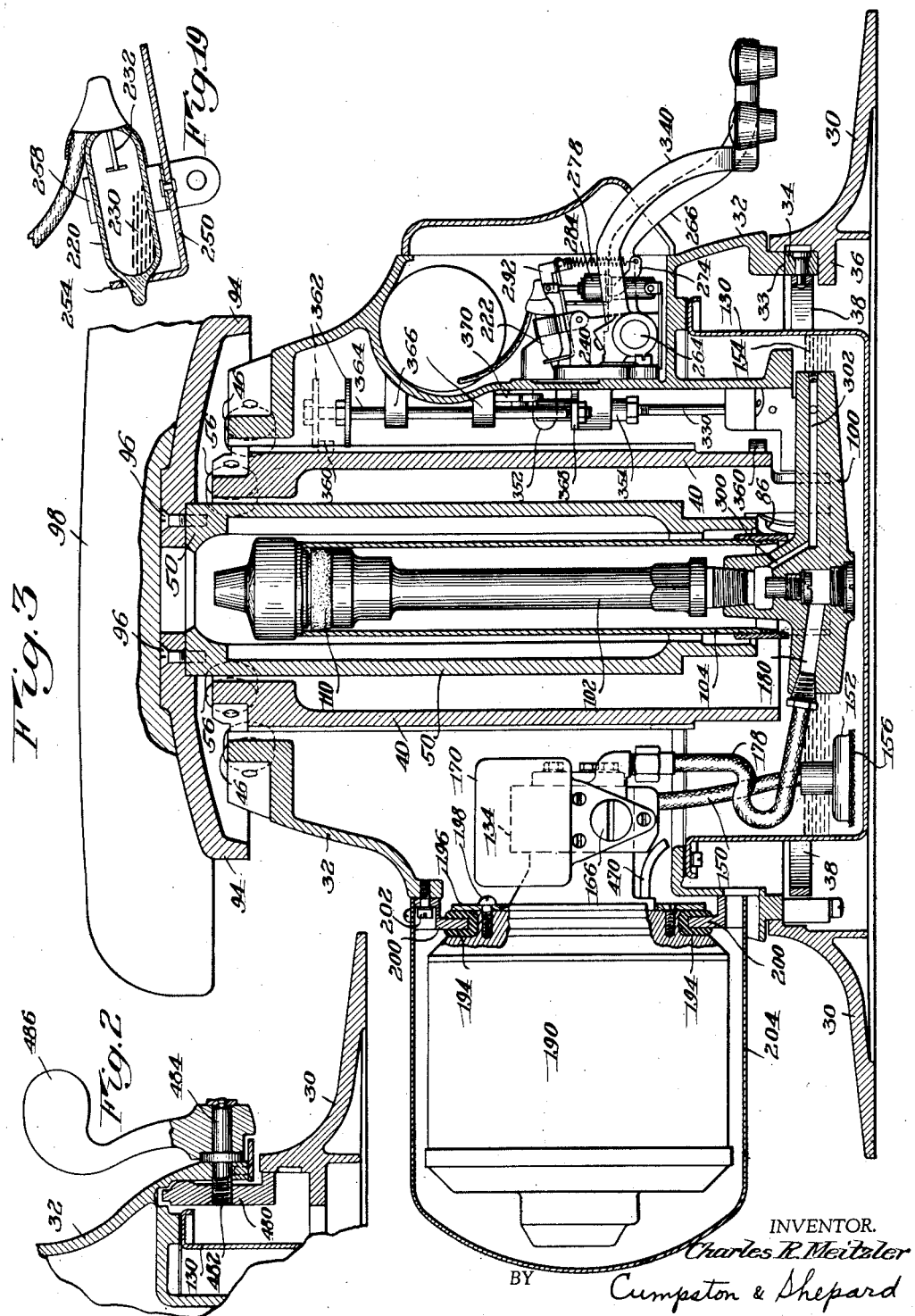

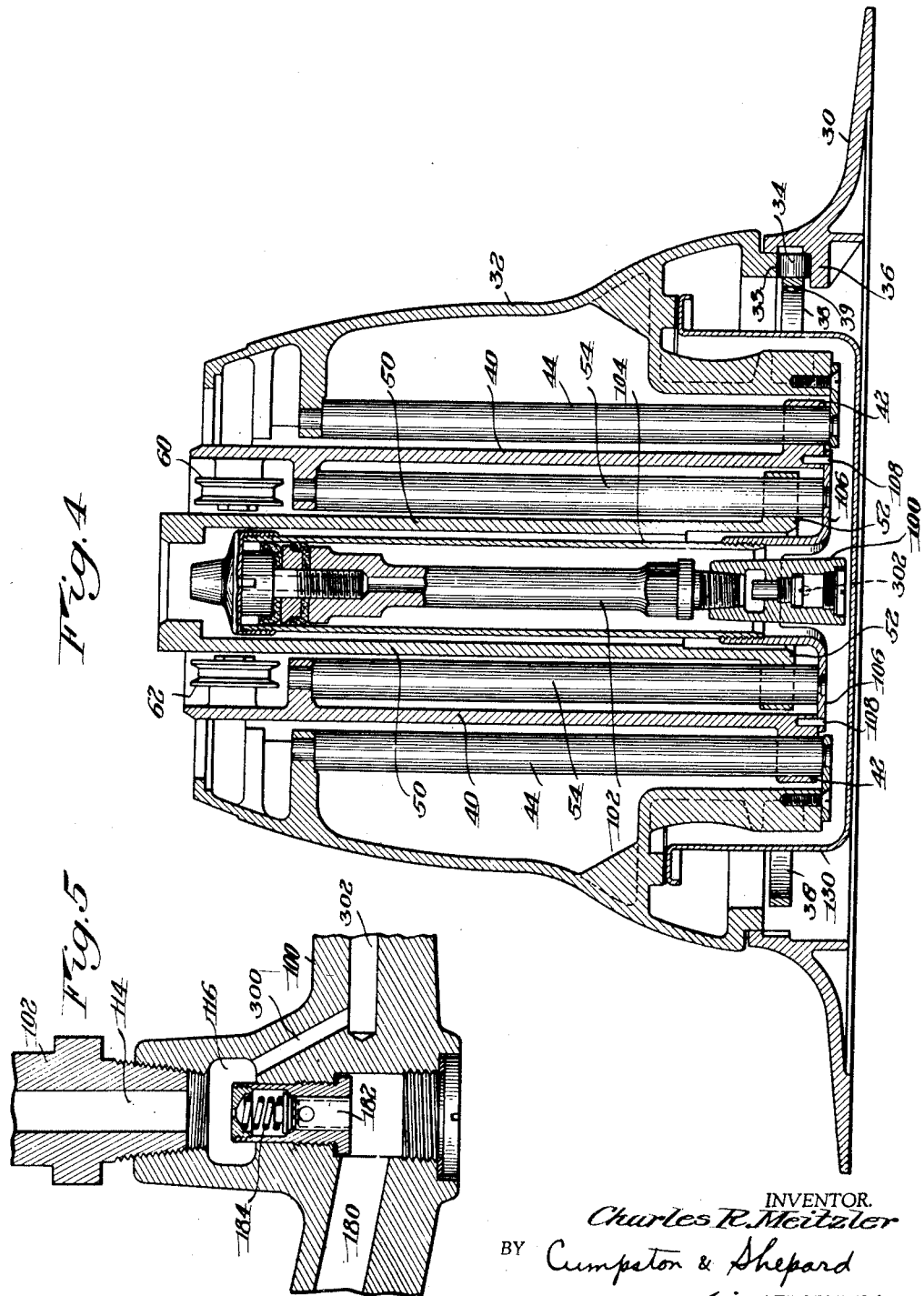

Sept. 24, 1940.                    C. R. MEITZLER                    2,215,666
                                  EXTENSIBLE CHAIR
                            Filed Feb. 4, 1937           11 Sheets-Sheet 4
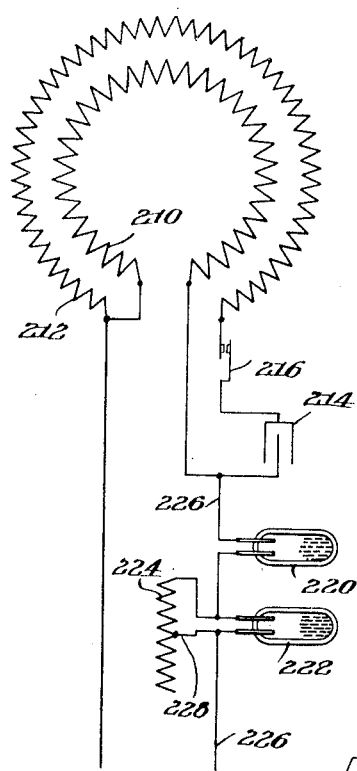
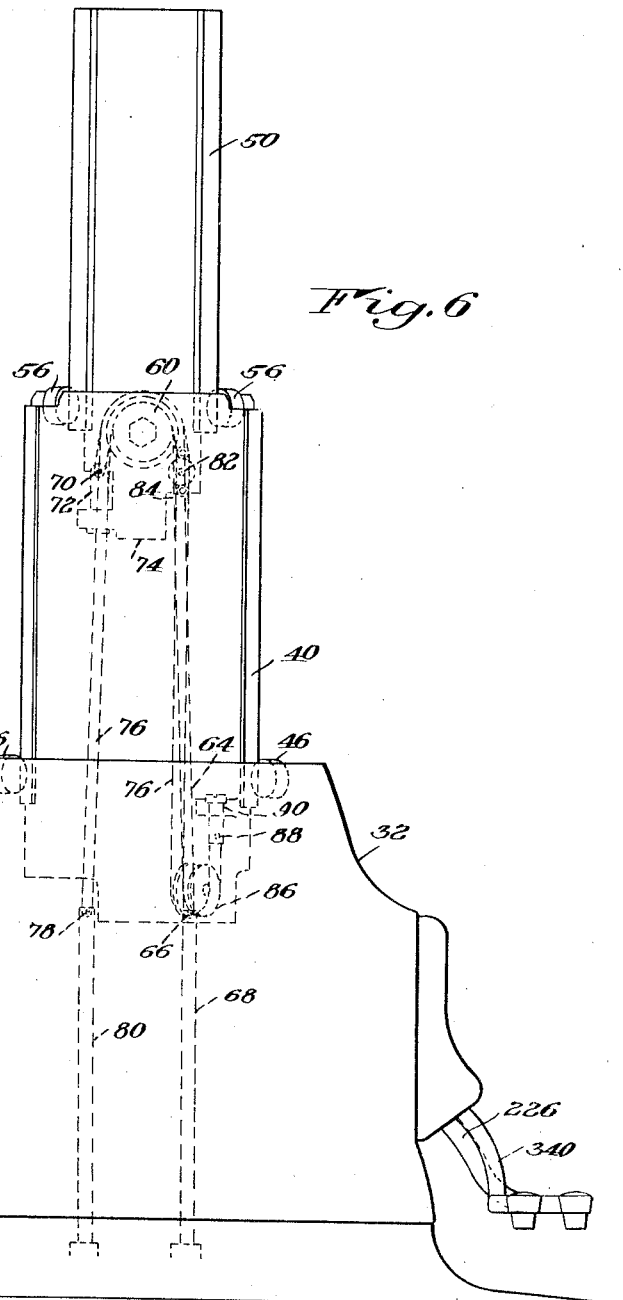
INVENTOR.
Charles R. Meitzler
BY Cumpston & Shepard
his ATTORNEYS

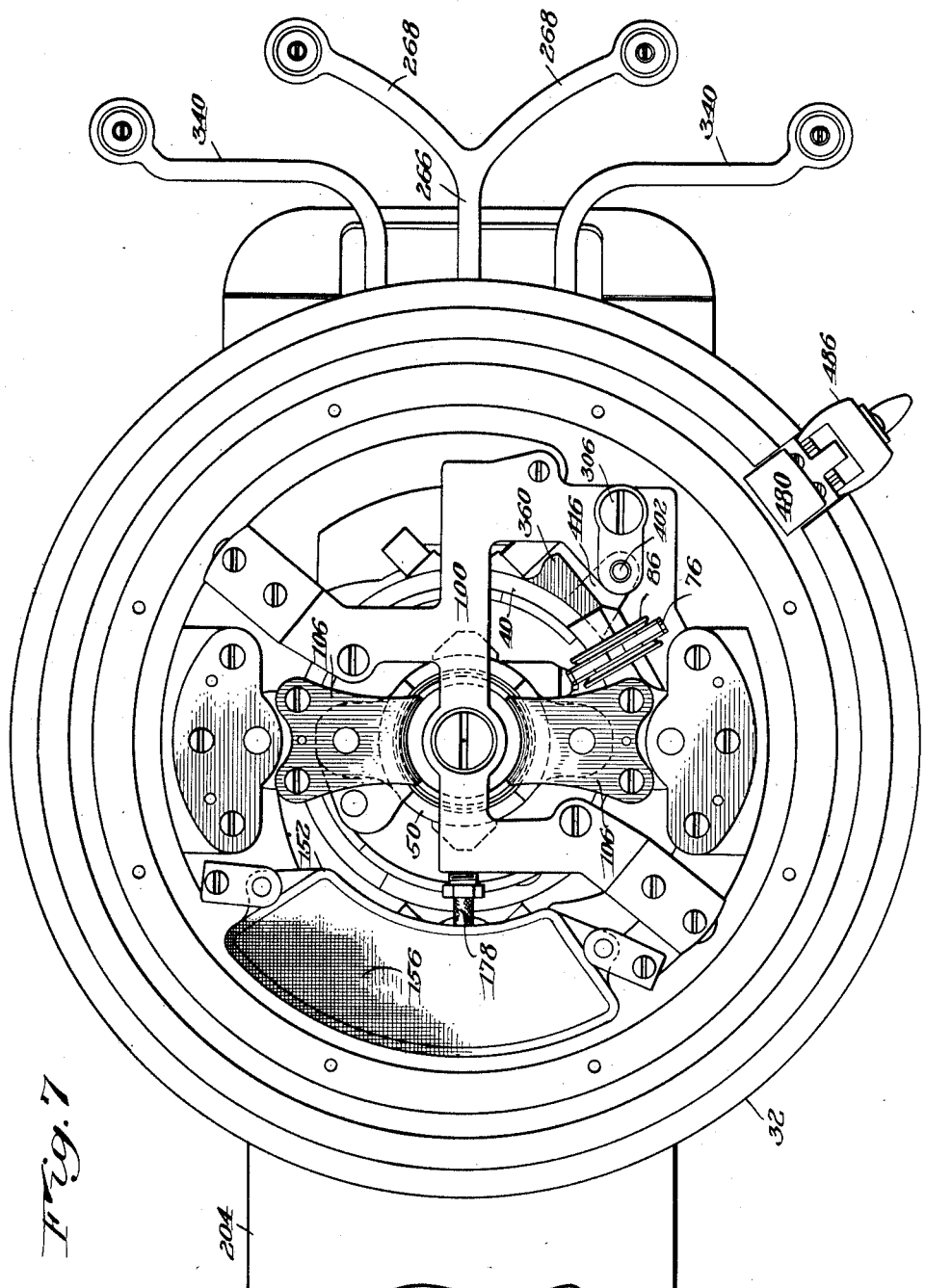

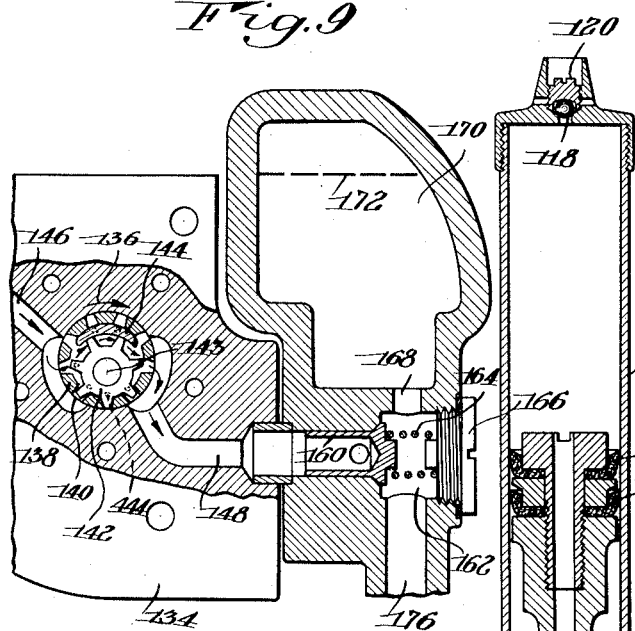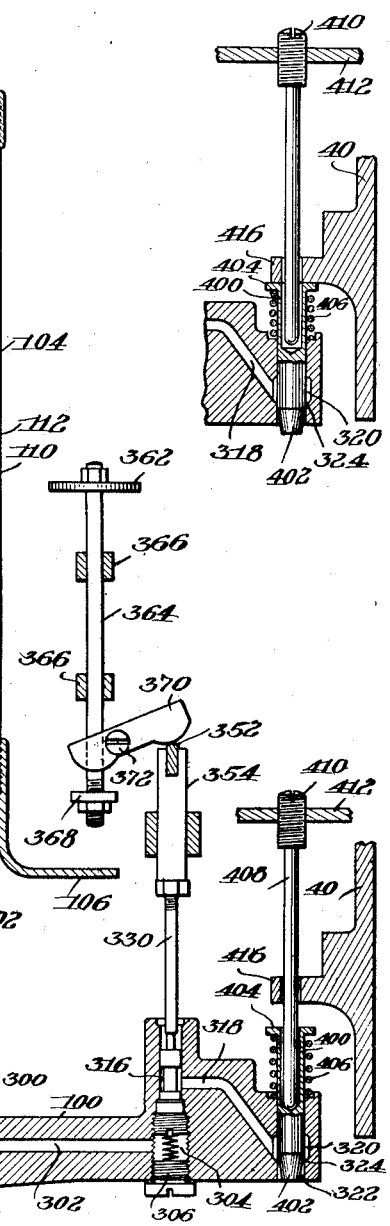

Sept. 24, 1940.   C. R. MEITZLER   2,215,666
EXTENSIBLE CHAIR
Filed Feb. 4, 1937   11 Sheets-Sheet 7
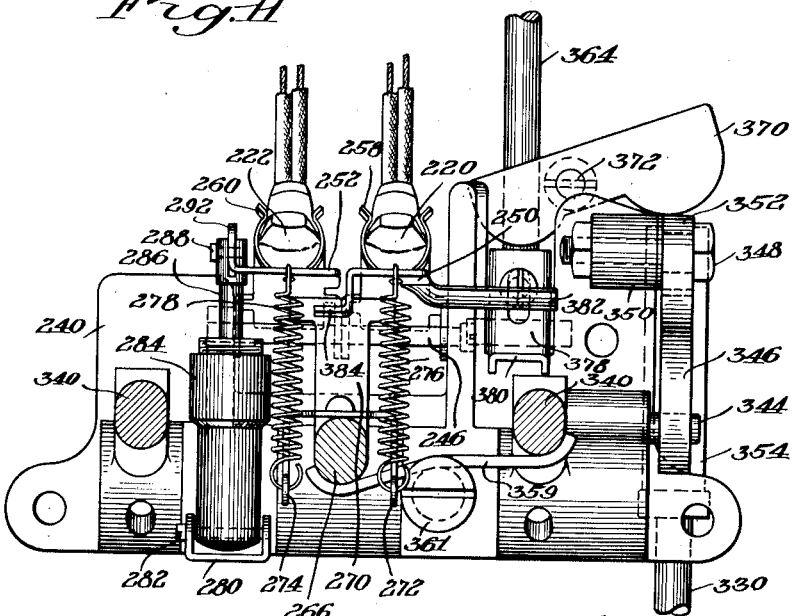
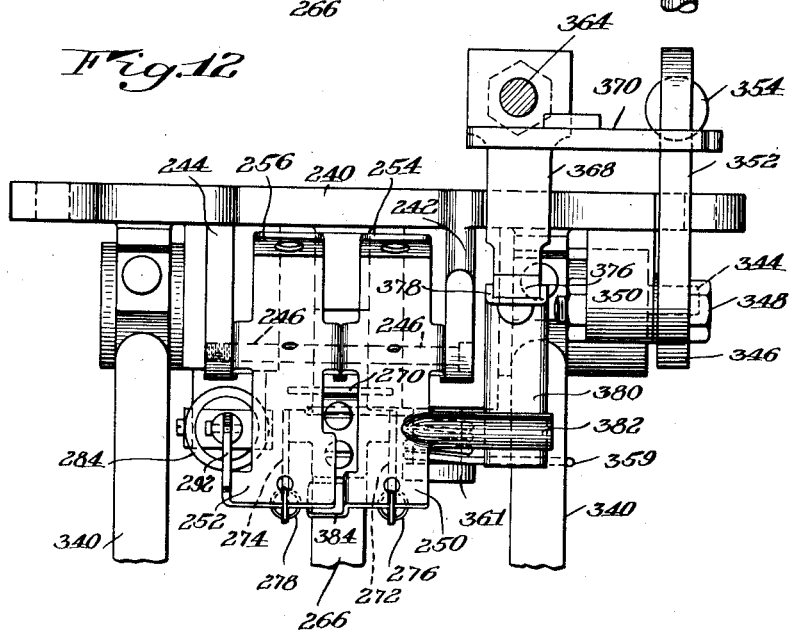
INVENTOR.
Charles R. Meitzler
BY Cumpston & Shepard
his ATTORNEYS

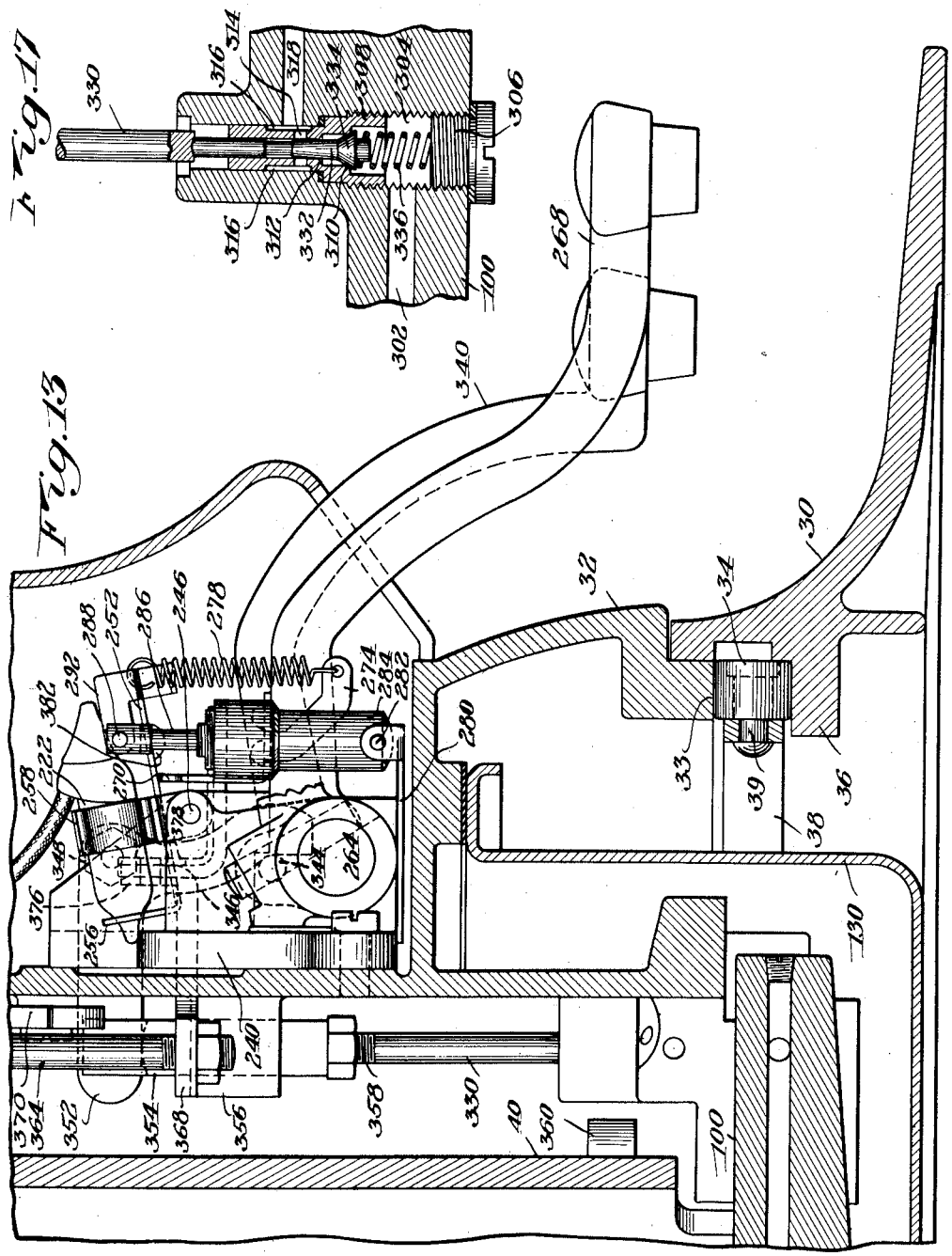

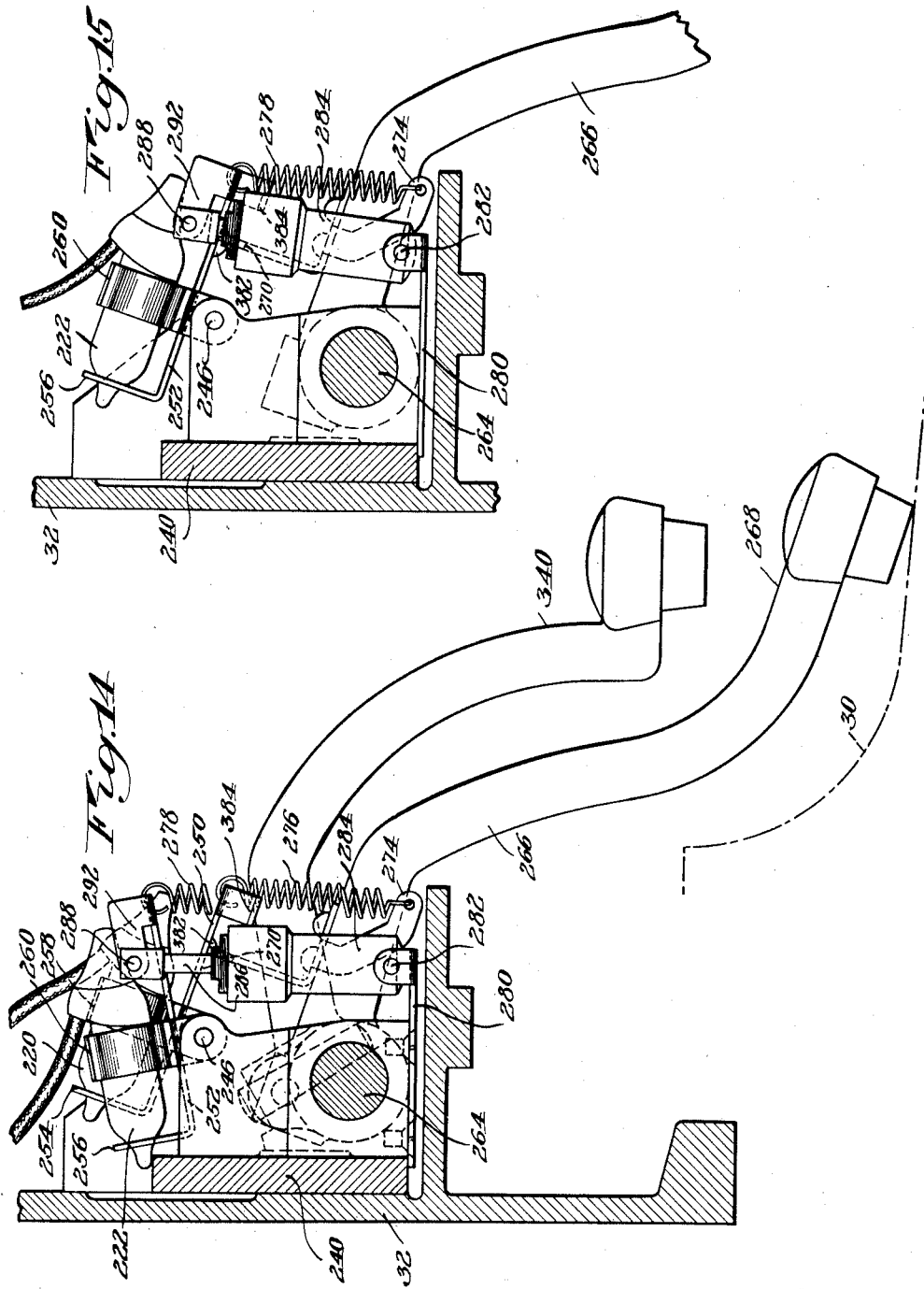

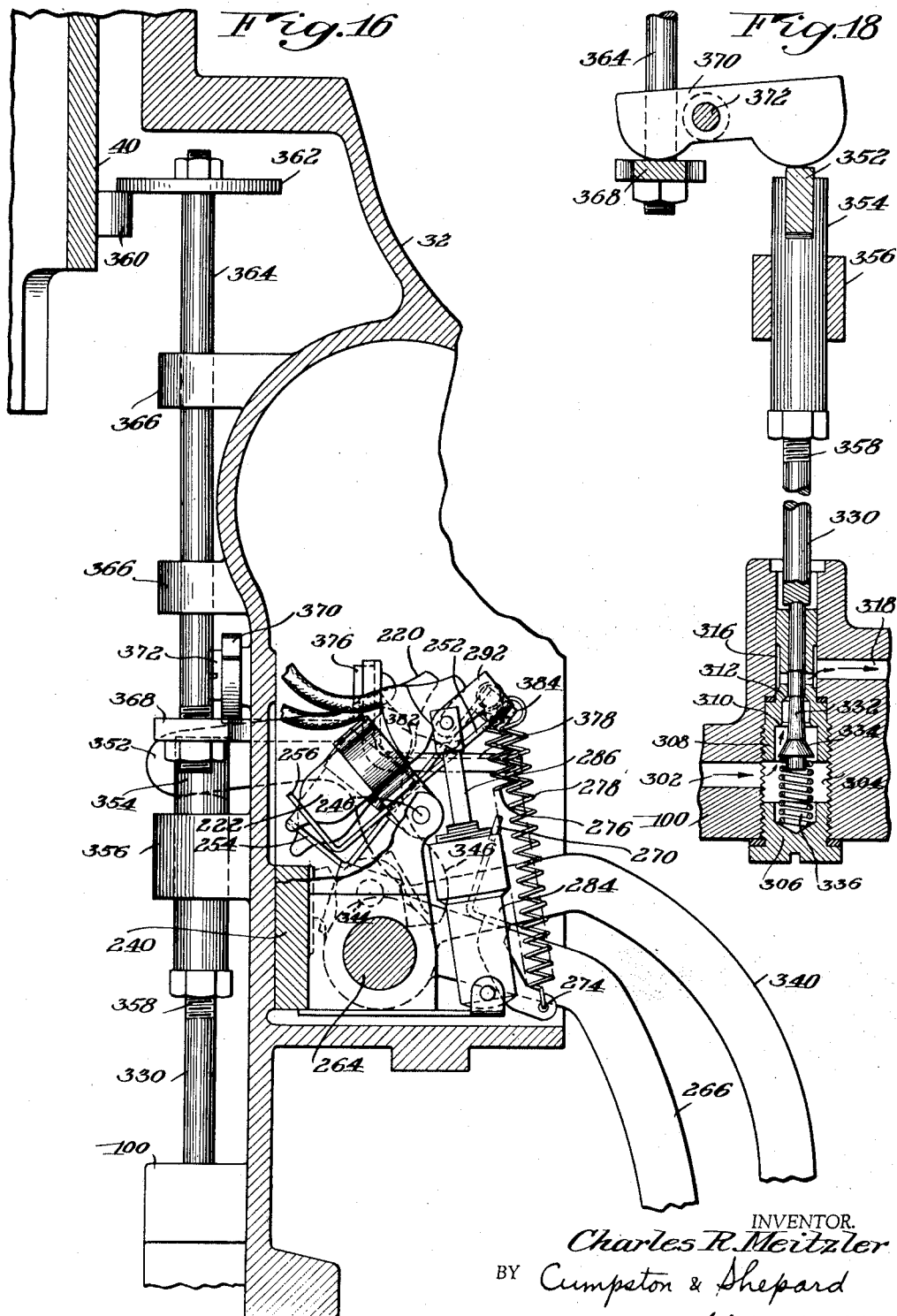

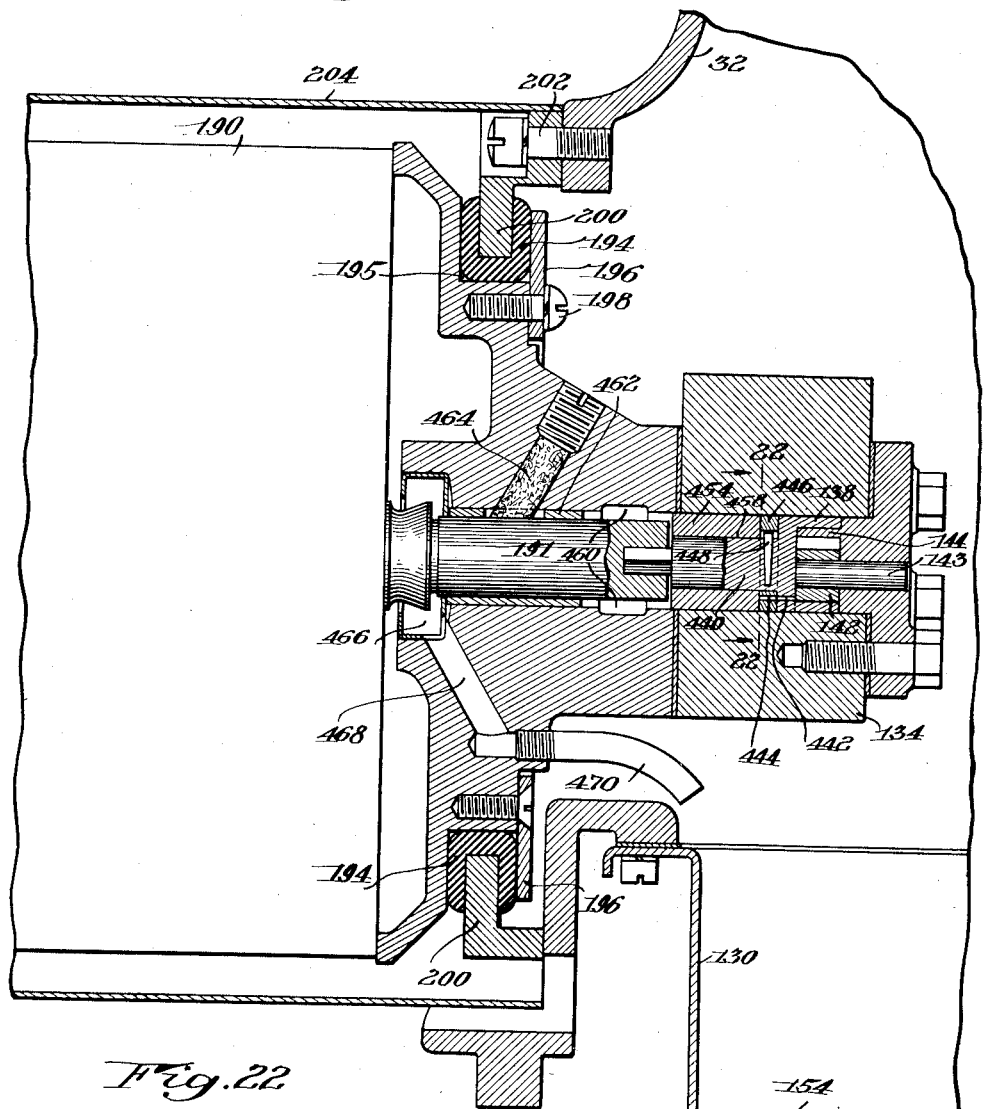
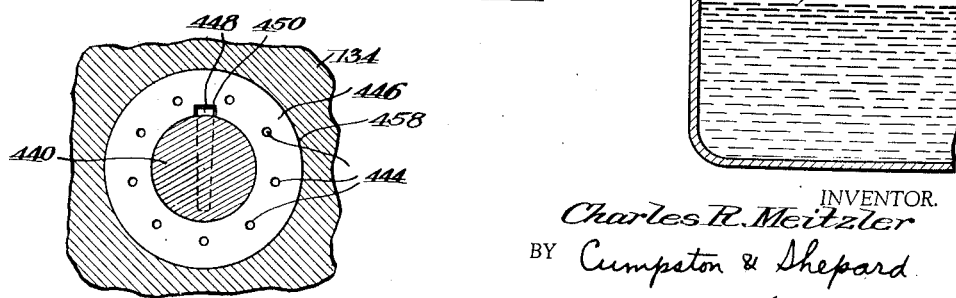

Patented Sept. 24, 1940

2,215,666

UNITED STATES PATENT OFFICE 2,215,666

EXTENSIBLE CHAIR

Charles R. Meitzler, Brighton, N. Y., assignor to Oscar H. Pieper, Rochester, N. Y., and Alphonse F. Pieper, Brighton, N. Y.

Application February 4, 1937, Serial No. 124,017

16 Claims. (Cl. 155—25)

This invention deals with elevating mechanism for rising and falling chairs, such as are used by dentists, barbers, physicians, and the like, which elevating mechanism is applicable also to operating tables or other devices intended to carry all or part of the weight of a human body, and the term "chair" as hereafter used is intended to be interpreted broadly as including all of such devices.

An object of the invention is the provision of a simple, efficient and more satisfactory extensible chair or rising and falling chair.

Another object of the invention is the provision of elevating mechanism so designed and constructed that the chair is started upwardly in an unusually smooth manner, thus avoiding jolts or jars commonly occurring in other chairs when they start upwardly.

Still another object is the provision of improved means for bringing the chair to a smooth stop, without jars, at the end of upward movement of the chair and especially at the end of the downward movement thereof.

A further object is the provision of smooth starting means applicable generally to electric motors or other electrically operated devices, in any field.

A still further object is the provision, in an extensible chair, of improved means for mounting the elevating motor in such manner that vibrations thereof are not transmitted to the chair structure and will not be felt by a person sitting in the chair.

A still further object is the provision of an extensible chair having various detailed improvements over prior chairs.

To these and other ends the invention resides in certain improvements and combinations of parts, all as will be hereinafter more fully described, the novel features being pointed out in the claims at the end of the specification.

In the drawings:

Fig. 1 is a plan of part of the mechanism of an extensible chair constructed in accordance with a preferred embodiment of the invention with the chair seat and other parts removed in order to show the construction beneath;

Fig. 2 is a vertical section taken substantially on the line 2—2 of Fig. 1;

Fig. 3 is a vertical section taken substantially on the line 3—3 of Fig. 1;

Fig. 4 is a vertical section taken substantially on the line 4—4 of Fig. 1;

Fig. 5 is a fragmentary vertical section through part of the construction shown near the bottom of Fig. 3, drawn on a larger scale and illustrating additional details;

Fig. 6 is a vertical section similar to a part of Fig. 3, illustrating additional details, and showing the elevating mechanism at or near the upper limit of its motion;

Fig. 7 is a bottom view or inverted plan view of certain parts near the bottom of the chair base and elevating mechanism, with parts in horizontal section;

Fig. 8 is a diagrammatic or schematic vertical section through the elevating mechanism in a partially elevated position, illustrating the relationship of certain operating and control parts to each other;

Fig. 9 is a vertical section through the oil pump and associated parts forming part of the elevating mechanism;

Fig. 10 is a vertical section through the parts shown at the lower right corner of Fig. 8, with a control valve in the different position which it assumes when the elevating mechanism reaches the lower limit of its travel;

Fig. 11 is a front elevation of certain electrical switches for controlling the elevating mechanism, together with part of the operating means for these switches;

Fig. 12 is a plan of the operating means shown in Fig. 11, with the switches themselves removed for the sake of clearness;

Fig. 13 is a side view with the parts in vertical section, of the switches and operating means shown in Fig. 11, with the switches in the closed position which they normally assume when the chair is at rest;

Fig. 14 is a view similar to a part of Fig. 13 showing the switches in the position which they assume at the beginning of an elevating movement;

Fig. 15 is a view similar to a fragment of Fig. 14, showing the switches in the position which they assume at a later stage in the elevating movement;

Fig. 16 is a view similar to Fig. 13 showing the switches in the open position which they assume when the elevating mechanism substantially reaches the upper limit of its motion;

Fig. 17 is a vertical section through a valve for controlling the descent of the chair, showing it in closed position;

Fig. 18 is a similar view of the same valve and of certain associated operating parts, showing the valve in open position;

Fig. 19 is a side elevation of one of the electrical control switches shown in Figs. 11 and 13;

Fig. 20 is a schematic wiring diagram illustrating the control circuits and the electric switches of the elevating motor;

Fig. 21 is a vertical section through the liquid pump and motor, illustrating the manner of mounting the motor and the means for lubricating one of the motor bearings, and Fig. 22 is a vertical section taken substantially on the line 22—22 of Fig. 21.

The same reference numerals throughout the several views indicate the same parts.

Referring first to Figs. 1, 3, and 4, the chair in its preferred form here disclosed as an illustrative embodiment comprises a stationary base section 30 resting upon and suitably secured to the floor or other suitable support. Rotatably mounted on this stationary section 30 is another base section 32 having a bottom edge 33 resting upon the tops of rollers 34 which ride on a track formed by an inwardly extending annular flange 36 on the stationary section 30, so that the base section 32 may rotate or oscillate through a limited range with respect to the section 30, about a vertical axis of rotation. A freely floating ring 38 has stub shafts or pins 39 forming axles on which the rollers rotate, to keep the rollers properly spaced at the desired points around the circumference of the tracks 33 and 36.

The base section 32 is hollow and receives within it a first or outer sleeve or telescoping section 40 of generally tubular form, at the lower end of which section 40 are ears 42 embracing vertical guide rods 44 fixed in the base section 32. Four guide rollers 46 are mounted on the base 32 near the top thereof and engage vertical guide rails 48 fixed to the telescoping section 40, so that the section 40 may rise and fall with respect to the base 32, being guided in its rising and falling movements by the ears 42 sliding on the guide rods 44 and by the tracks 48 engaging the guide rollers 46.

Within the hollow section 40 is a second or inner sleeve or tubular telescoping section 50 having, near its bottom end, ears 52 extending laterally and embracing guide rods 54 fixed in the first telescoping section 40. Four guide rollers 56 are mounted on the first section 40 near the top thereof, and engage vertical guiding tracks 58 on the inner telescoping section 50. Thus the inner telescoping section may rise and fall with respect to the outer section 40, being guided in its rising and falling movements by the ears 52 sliding along the guide rods 54 and by the rollers 56 engaging the tracks 58. All of the rollers 46 and 56 are preferably mounted on eccentric bearing shafts, so that the rollers may be easily and accurately adjusted to the proper degree of pressure against their respective guide rails by turning the bearing shaft.

Two sheaves or pulleys 60 and 62 (Figs. 1, 4, and 6) are mounted on the outer telescoping section 40 adjacent the upper end thereof. A chain or other suitable flexible element 64 is fastened at one end at 66 to the upper end of a link 68, the lower end of which is fixed to the base section 32. From the end 66 the chain 64 extends upwardly around the pulley 60 and then downwardly to its other end attached at 70 to a connecting piece 72 secured to a bracket or lug 74 formed integrally with or suitably fixed to the inner telescoping section 50 adjacent the lower end thereof. Similarly, a second chain 76 is secured at one end at 78 to a link 80 fixed to the base section 32, and extends from this point 78 upwardly to the other pulley 62, around this pulley, and thence downwardly to the point 82, where it is attached to a connecting piece 84 likewise secured to the lug or bracket 74 of the inner telescoping section 50. This second chain, however, instead of stopping at the point 82, continues downwardly to a lower sheave or pulley 86 mounted on the outer telescoping section 40 near the bottom thereof, and extends around this pulley 86 and upwardly to a connecting piece 88 secured to a suitable lug or bracket 90 on the base section 32.

If the outer telescoping section 40 be raised, this will raise the pulleys 60 and 62 which are mounted on this telescoping section. The ends 66 and 78 of the chains 64 and 76, respectively, can not move upwardly; hence the upward movement of the pulleys will draw the end 70 of the chain 64 and the connection point 82 of the chain 76 upwardly, and thus will raise the inner telescoping section 50 at a rate twice as fast as the rate of upward movement of the outer section 40, so that the inner section 50 will be elevated to its extreme uppermost position at the same time that the outer section 40 reaches its extreme uppermost position, assuming that the range of travel of the section 50 with respect to the section 40 is the same as the range of travel of the section 40 with respect to the base section 32. The sections 40 and 50 are shown in their fully elevated or extended condition in Fig. 6, while Figs. 3 and 4 show these same sections in their fully telescoped or extreme lower positions. The purpose of extending the chain 76 beyond the connection point 82 to pass downwardly around the pulley 86 is so that if the chair seat or other part connected to the inner telescoping section 50 should be bodily lifted, it would carry the outer telescoping section 40 up with it at the proper rate and the two sections thus can not become disconnected from each other nor can the inner section 50 be lifted in such manner as to disengage the chains from the pulleys 60 and 62.

The chair seat, operating table, or other article to be lifted is suitably mounted upon the inner telescoping section 50. It may be mounted thereon in many different ways, the details of such mounting forming no part of the present invention. For example, a seat base 94 may be secured to the top of the section 50 as by means of screws 96, and a chair seat indicated diagrammatically at 98 may rest upon this seat base 94.

In the preferred illustrative example of the invention, the chair seat 98 or other article to be raised and lowered is raised by fluid pressure means acting upon and lifting the outer sleeve or telescoping member 40, the upward motion of which raises the inner sleeve or telescoping member 50 by means of the chains 64 and 76. The fluid pressure means is preferably liquid pressure means, although gas may be used instead of liquid in some instances.

In the preferred form, the liquid pressure means includes a fixture 100 (Figs. 3, 7, and 8) rigidly mounted on the base section 32 near the bottom thereof. A standpipe 102 is threaded into a tapped opening in the top of the fixture 100, and extends upwardly concentrically with the tubular telescoping members 40 and 50. A cylinder 104 surrounds the standpipe 102 and has, at its bottom end, laterally extending bracket portions 106 which underlie the lower edges of the outer telescoping tube 40, and are connected thereto by pins 108 as shown especially in Fig. 4. Upward movement of the cylinder 104 will thus raise the member 40, which, in turn, will raise the member 50 through the action of the chains.

Packing rings 110 and 112 may be provided near the upper end of the standpipe 102 to seal the sliding joint between the standpipe and the cylinder. Fluid may be introduced into that portion of the cylinder above the packing, through a bore 114 which extends through the center of the standpipe and which communicates at its lower end with a cavity 116 in the fixture 100. When a liquid is used as the operating medium for the cylinder, as is preferably the case, then the cylinder may be provided at its upper end with a vent valve in the form of a ball 118 which can be screwed down tightly against the valve seat by means of a cap or nut 120. When the liquid holding members of the mechanism are initially being filled with liquid (such as oil, glycerine, or other desired liquid) the cap 120 is slightly loosened so that the air initially trapped in the cylinder 104 can escape therefrom. As soon as the air has all escaped and the liquid begins to escape through the vent valve, the cap 120 is screwed tightly down, which maintains the valve 118 permanently closed.

Beneath and surrounding the fixture 100 is a pan 130 (Fig. 3) preferably secured to and turning as a unit with the rotary base section 32. This pan holds the supply of oil, glycerine, or other liquid which is forced into the cylinder 104 when it is desired to raise the chair.

To force the oil into the cylinder, there is provided a pump having a casing 134 (Figs. 8, 9, and 21) in which rotates, in the direction of the arrow 136, a sleeve or annular member 138 having tooth spaces 140 therein. A gear 142, mounted eccentrically of the sleeve 138 for rotation on a stub shaft 143, has teeth engaging in the tooth spaces 140 of the sleeve 138 at one side of the gear, the other side of the gear being separated from the sleeve by a fixed or stationary fin or separator 144.

As the sleeve 138 rotates, rotating the gear 142 with it, liquid is drawn in at the inlet 146 of the pump housing and discharged at the outlet 148 thereof. The inlet 146 is connected by a flexible connection, such as a flexible metal hose 150, with a suction fixture 152 immersed in the body of liquid 154 in the pan 130, the fixture 152 having screens 156 for filtering or straining the liquid to keep foreign matter out of the pump. As the pump operates, liquid is drawn into the fixture 152 through the screens 156, thence travels up the hose connection 150 to the inlet 146 of the pump, passes through the pump, and is discharged through the outlet passageway 148.

From the outlet passageway the liquid is forced through a check valve 160 into a chamber 162. A coiled spring 164 presses at one end against a screw plug 166 constituting one wall of the chamber 162, and at its other end against the check valve 160 to tend to hold the check valve in closed position against its seat. From the chamber 162, one passageway 168 leads upwardly to a large chamber 170, which is completely closed or sealed except for the passageway 168 entering its bottom, so that this chamber constitutes an air bell or compression chamber, in which liquid may rise to a level such as that indicated diagrammatically by the dotted line 172, until the pressure of the air or other gas trapped above the level of the liquid equals the pressure of the liquid.

From the check valve chamber 162 another passageway or duct 176 leads downwardly and communicates with a flexible connection, such as a flexible metal hose 178, which leads to a passageway 180 in the fixture 100. This passageway 180 communicates with the chamber 116 in the fixture 100 through a check valve 182 (Fig. 5), normally held against its seat by a coiled spring 184, the check valve being arranged so that liquid may flow from the passageway 180 through the check valve 182 to the chamber 116, but may not flow backwardly from the chamber 116 through the check valve to the passageway 180.

When the pump is operated, liquid is drawn from the body of liquid 154 in the pan 130 and forced through the connections 178 and 180 to the chamber 116, and, unless some other avenue of escape is then open, the liquid must flow upwardly through the duct 114 in the standpipe 102 and into the upper part of the cylinder 104 above the packing 110 and 112, thus forcing the cylinder 104 upwardly as operation of the pump is continued, and raising the chair.

The pump is driven preferably by an electric motor 190 (Figs. 3 and 21), which is preferably directly connected to the pump, the pump part 138 being in alinement with and directly connected to the armature shaft 191 of the motor. The motor and the pump together preferably form a single unitary assembly which may be conveniently referred to as the power unit.

The power unit is secured in the base section 32 of the chair by means of a gasket 194 of rubber, rubber composition, or other suitable resilient material, which gasket extends circumferentially around a shoulder or groove 195 formed at one end of the motor 190. The gasket is of U-shaped cross section, as shown in Figs. 3 and 21. It is held in place on the shoulder 195 of the motor by an annular plate 196 secured to the motor housing by means of screws 198. An annular flange or rib 200 enters the peripheral groove of the gasket 194 and is secured, as by means of screws 202, to the base section 32. A metal cover plate or casing 204 may surround the motor and be suitably secured to the base 32, but this casing is out of contact with the motor frame or housing at all points, as shown in Fig. 3.

It is particularly noted that all connections between the power unit and the other parts of the chair are entirely through rubber or other suitable resilient material, with no rigid metal connections whatever between the power unit and the rest of the chair. The mounting of the power unit, as above stated, is entirely through the resilient gasket 194, there being no metal-to-metal connection, and even the liquid connections from the pump to the liquid reservoir and to the liquid pressure cylinder are through the flexible resilient hoses 150 and 178, rather than through rigid metallic pipes. Hence vibration of the power unit is absorbed by the resilient connections and is not transmitted to other parts of the chair. This results in a chair which is unusually free from vibration during an elevating operation, and which also is unusually quiet, since the resilient connections prevent the power unit from setting up noise-forming vibrations in other parts of the chair.

Not only is the chair free from vibration, but also the lifting action is unusually smooth, due partly to the special motor starting means to be described hereafter, which cause a slow and smooth starting of the motor and pump, and partly to the air bell 170, which acts like a resilient cushion serving to damp any surges or irregularities in the delivery of liquid by the pump and resulting in a smooth even flow of liquid into the cylinder 104. The smoothness of starting a lifting movement of the chair is also due partly to the advantageous arrangement of check valves and other valves, as will be pointed out hereafter.

The motor 190 itself may be of any suitable kind or type, either a direct current motor or an alternating current motor, or a motor capable of running alternatively upon either direct or alternating current. Excellent results have been obtained from what is called a "capacitor motor" such as is currently available on the market. As shown in the wiring diagram, Fig. 20, such a motor includes a running winding 210, a starting winding 212, a capacitor 214 in series with the starting winding, and a centrifugal switch 216 in series with the capacitor and the starting winding. The running winding, on the one hand, is in parallel or multiple with the starting winding, centrifugal switch, and capacitor on the other hand. When the current is first turned on it flows through both the running winding and the starting winding and starts the motor. As the motor picks up speed, the centrifugal switch opens and thereafter the current flows only through the running winding.

According to the present invention, a resistance is connected in series with the motor when it is first started, in order to obtain a more smooth and gentle start. After a short time interval, the resistance is cut out so that the motor then operates at full power.

To accomplish this improved control, according to the present invention, two separate switches are provided in the circuit leading to the motor. One of these, indicated at 220 in Fig. 20, is the main starting and stopping switch of the motor, while the other, shown at 222, is the switch which controls the resistance 224, and is connected in parallel or multiple with the resistance, which resistance is placed in series in one of the main circuit wires 226 leading to the motor. The resistance may be adjusted by moving the terminal 228 to different positions along the resistance.

When first starting the motor, the switch 220 is closed but the switch 222 remains open. Thus current can reach the motor only by flowing through the resistance 224, and this resistance decreases the power of the motor so that it starts slowly and smoothly, raising the chair gradually without any appreciable sudden upward lurch or jar, such as would be caused if the motor began to operate at full power and speed practically instantaneously. Soon after the motor is started, the switch 222 is closed. This switch short-circuits the resistance 224, so that current now flows through the closed switch 222 instead of through the resistance, thus cutting out the resistance and enabling the motor to operate at full power and speed.

With this control arrangement, the motor reaches its ultimate speed or power in two stages or steps, first with the resistance 224 connected in the line, and then with the resistance omitted. The smooth starting of the motor and smooth initial upward movement of the liquid pressure lifting means is particularly useful and advantageous in an extensible chair, because it avoids the unpleasant sudden upward lurch common in many prior chairs, which is often quite distasteful to the person sitting on the chair. This control arrangement, however, is not limited to chairs, but may be used in a wide variety of fields.

The control switches 220 and 222 are conveniently in the form of mercury tube switches, and may be identical with each other. One of them, such as 220, is shown in Fig. 19, and comprises a closed tube of suitable dielectric material, such as glass, having a small quantity of mercury 230 therein, and having two spaced contacts 232. When the tube is tilted in one direction, as in Fig. 19, the mercury is away from the spaced contacts and the contacts are, therefore, not connected to each other. If the tube be tilted in the opposite direction, the mercury will run into contact with the two contact members and form an electrical connection between them, thus closing the switch.

The mechanism for operating the switches 220 and 222 may be constructed as shown, for example, in Figs. 11, 12, and 13. A mounting plate 240 is secured at a convenient point on the base section 32 of the chair. Lateral arms 242 and 244 on the plate 240 carry a stud 246 extending approximately horizontally, on which stud two tilting platforms 250 and 252 are mounted by means of downturned ears on the sides of the platforms which have holes through which the stud 246 extends. One end of each platform is bent up as shown at 254 and 256, respectively, the upturned end being provided with an opening for receiving the end of the mercury tube switch mounted on the platform, as shown in Fig. 19. Resilient spring clips 258 and 260 are riveted or otherwise suitably secured to each platform 250 and 252, these clips embracing the switch tubes to hold them against displacement, as indicated in Figs. 11, 13, and 19.

At an elevation somewhat below the switch platforms 250 and 252, there is a short horizontal shaft 264 journaled in the lower ends of the arms 242 and 244. Near the middle of this shaft 264 is a pedal 266, freely rotatable on the shaft and extending laterally and downwardly therefrom, as shown in Figs. 13 and 14, and terminating in a bifurcated end 268 providing two arms extending to conveniently accessible positions as shown in Fig. 1. Secured to this pedal 266 at a point near the shaft 264 is an upstanding arm 270 having a top edge which underlies the outer or forward ends of both of the switch platforms 250 and 252, as seen in Figs. 11 and 13. When the pedal 266 is in its uppermost position, the arm 270 holds both of the switch platforms 250 and 252 with their forward ends tilted upwardly to a position where both switches are open, this being the position of Figs. 11, 13, and 19.

Two arms 272 and 274 are connected to the pedal 266. A spring 276 is connected at its upper end to the front end of the switch platform 250, and at its lower end to the arm 272. Another spring 278 is connected at its upper end to the front end of the platform 252 and at its lower end to the arm 274. Thus the springs 276 and 278 both tend constantly to move or tilt the switch platforms 250 and 252 to shift the forward or outer ends downwardly to a position in which the switches will be closed. So long as the pedal 266 remains elevated, the arm 270 holds the switch platforms up against the tension of the springs 276 and 278. If the pedal 266 be depressed, however, the support of the platforms by the arm 270 is withdrawn, and the springs 276 and 278 can move the front ends of the platform downwardly and close the switches.

The mounting plate 240 is provided with a laterally extending arm 280 having upturned ears carrying a stud 282 on which is pivoted the lower end of a dashpot 284. This dashpot includes a cylinder filled with glycerine or other suitable fluid, and a piston movable only relatively slowly in a downward direction in the cylinder, due to the resistance offered by the fluid. The piston is operatively connected to a piston rod 286 which is pivoted at 288 to an ear 292 near the forward end of the switch platform 252.

With this arrangement, when the pedal 266 is depressed, the platform 250 will immediately be swung downwardly by its spring 276, as fast as the depression of the arm 270 permits, and the switch 220 mounted on the platform 250 will thus be closed, starting the motor of the pump. The other switch platform 252, however, will not swing downwardly so quickly, because of its connection to the dashpot 284. Hence, there will be an appreciable time interval during which the switch 220 on the platform 250 is closed, while the switch 222 on the platform 252 remains open. During this time interval, the resistance 224 will be operatively interposed in the motor circuit, as above explained. Finally, the spring 278 pulls the switch platform 252 down far enough to close the switch 222 mounted on this platform, and then the resistance 224 is short-circuited and cut out of the motor circuit, as above explained. When the pedal 266 is again raised, the arm 270 simultaneously lifts both switch platforms and opens both switches.

The time interval elapsing between the closing of the switch 220 and the closing of the switch 222 may be varied at will by suitable adjustment of the dashpot. Ordinarily a time interval of about two seconds to five seconds gives good results.

The principal parts of the mechanism for raising the chair have now been described. For lowering the chair, the motor and pump are not employed, but fluid is permitted to escape from the cylinder 104, and the chair descends by gravity.

Referring now to Figs. 3, 8, 17, and 18, the fixture or spider 100 has a duct or passageway 300 leading from the chamber 116 to another passageway 302 which opens into a chamber 304, the lower end of which is closed by a screw plug 306. Screwed in the upper part of the chamber 304 is an annular sleeve 308 having shoulders providing a lower valve seat 310 of one diameter and an upper valve seat 312 of smaller diameter. Above the upper valve seat 312, a central bore continues upwardly through the sleeve 308 to the top thereof. At an intermediate point in the height of this bore, lateral passages 314 extend approximately radially outwardly from the central bore to an annular circumferential passage 316 around the periphery of the sleeve 308, which passage 316 communicates with a duct or passageway 318 in the fixture or spider 100. The passageway 318 leads to a chamber 320 (Figs. 8 and 10) formed as an enlargement at an intermediate point of a vertical bore 322 extending entirely through the fixture 100 from top to bottom, the bottom end of the bore opening into liquid pan 130 so that any liquid escaping from the bottom of the bore becomes part of the liquid in the reservoir. A shoulder at the bottom edge of the chamber 320, where the lower part of the vertical bore 322 opens into the chamber, forms a valve seat 324.

Two valves are provided, one for cooperation with the valve seats 310 and 312, and the other for cooperation with the valve seat 324. The first of these valves, best shown in Figs. 17 and 18, comprises a vertical stem 330 extending downwardly into the top of the sleeve 308 and having a frusto-conical valve section 332, of relatively small apex angle, for cooperation with the upper valve seat 312. Below this valve portion 332 is a second frusto-conical valve portion 334 of substantially greater apex angle, for cooperation with the lower valve seat 310. A coiled spring 336 presses downwardly upon the plug 306 and upwardly upon the bottom of the valve stem, constantly tending to close the valve. When it is closed, the portion 334 is tightly seated on the seat 310, and the valve portion 332 is tightly seated on the seat 312, thus closing the fluid passageway at two separate points and providing an extremely tight seal. The closed position is illustrated in Fig. 17.

By pressing downwardly upon the valve stem 330, however, with sufficient force to overcome the pressure of the spring 336 and the pressure of the liquid below the valve, the valve may be opened to the position shown in Fig. 18. When thus opened, the liquid seeking escape from the passageway 332 may pass upwardly past the valve seats 310 and 312, in the direction of the arrows in Fig. 18, emerging laterally through the radial passageway 314 into the annular passageway 316 and from this into the duct 318.

This valve on the stem 330 is the main control valve for lowering the chair, table, or other article mounted on the elevating mechanism. It is preferably controlled in two different ways, one at the will or under the control of the operator, and the other automatically in case of excessive elevation of the chair.

The control at the will of the operator includes a pair of lowering control pedals 340 (Figs. 1, 12, and 13) which are fixed on the shaft 264 adjacent opposite ends thereof and which extend downwardly and laterally to conveniently accessible positions, one on either side of the bifurcated pedal portions 268. Thus by depressing either one of the pedals 340, the shaft 264 is rotated slightly in a clockwise direction when viewed as in Figs. 13 and 16. When the shaft is so rotated, a pin 344 (Figs. 11 and 13) projecting laterally from an arm fixed to the shaft 264 or, preferably, from an enlargement or boss on the right hand one of the pedals 340, presses forwardly against the rear side of the depending arm 346 of a bell crank lever pivoted on the stud 348 mounted in a lug 350 on the mounting plate 240. Another arm 352 of this bell crank lever extends inwardly approximately horizontally, through a suitable hole in the chair base 32, and lies loosely in a vertical notch or recess formed in the upper end of a rod 354, which is guided for vertical movement in a guideway 356. The rod 354 is in vertical alinement with the valve stem 330 and is connected thereto as by means of the screw threaded connection 358.

A spring 359 (Figs. 11 and 12) has its central portion coiled around a stud 361, and has one end underlying one of the chair lowering pedals 340 and the opposite end underlying the chair raising pedal 266, thus resiliently tending at all times to keep all of the pedals in their uppermost positions, but allowing any of them to be depressed by downward pressure of the operator's foot.

When either one of the two pedals 340 is depressed, the consequent rotation of the shaft 364 and forward movement of the pin 344 will thus operate the bell crank arms 346 and 352, the latter of which will press downwardly upon the rod 354, causing downward movement of the valve stem 330 and opening the valve 332, 334. Liquid may then flow out of the cylinder 104 through the ducts or passageways 114, 300, and 302, past the open valve 332, 334 and through the duct 318, back to the liquid reservoir 130, when and so long as the valve associated with the seat 324 is open. This valve will be described below.

When the valve stem 330 is depressed, the first part of the downward movement quickly carries the conical portion 334 of the valve away from its seat 310, to open the valve at this point. The other conical portion 332 of the valve, due to its smaller apex angle, moves away from its seat 312 more slowly, so that the rate of flow through the valve is capable of fine regulation by varying the extend to which the valve stem is depressed.

The second or automatic means for opening the valve 332, 334, will now be described, with special reference to Figs. 3, 8, 16, and 18. The outer sleeve or telescoping member 40 carries a laterally projecting lug or ear 360. As the member 40 approaches closely the upper limit of its motion, the lug 360 hits the lower side of a washer 362 secured to the upper end of a rod 364 mounted for substantially vertical movement in guides 366 on the chair base 32, thus raising the rod. A lug 368 secured to the lower end of the rod then presses upwardly on one end of a two armed lever 370 pivoted at an intermediate point on a pivot 372 secured on the base 32. The upward movement of this one end of the lever 372 causes downward movement of the opposite end thereof, which opposite end overlies the arm 352 of the bell crank lever previously mentioned.

The lateral extension 368 on the bottom of the rod 364 extends outwardly through a suitable opening in the base section 32 and in the mounting plate 240, as best shown in Figs. 12 and 13. The outer end of this extension 368 is bent upwardly at 376 and overlaps an upwardly extending arm 378 adjustably secured to the portion 376 by a screw and slot connection, so that the portion 378 may be moved upwardly or downwardly with respect to the arm 368 through a limited range of adjustment. Secured to the portion 378 is a forward horizontal extension 380 (Figs. 11, 12, and 13) underlying a lateral extension 382 on the platform 250 carrying the electric switch 220. Another arm 384 extending laterally from the platform 250 underlies the front right corner of the other switch platform 252 as shown in Figs. 11 and 12, so that raising the front edge of the platform 250 will necessarily raise the front edge of the platform 252 also.

The various parts are so arranged that as the telescoping sleeve section 40 of the elevating mechanism approaches close to the upper limit of its motion, it begins to raise the rod 364 and the first part of the upward movement of this rod raises the lateral extension 368 sufficiently far so that the arm 380 mounted on the extension 368 comes into contact with the underside of the arm 382 on the switch platform 250, and tilts the outer end of this switch platform upwardly to open the switch 220. This upward tilting of the switch platform 250 causes corresponding upward tilting of the other switch platform 252 because of the extension 384 and thus the switch 222 mounted on the platform 252 is also opened. Opening of these switches, especially of the switch 220, normally stops operation of the motor and of the pump, so that upward movement of the elevating mechanism ceases.

The play or lost motion of the parts is such that this tilting of the switch platforms 250 and 252, to open the switches, occurs before the lever 370 causes any downward pressure on the rod 354 to open the valve 332, 334. Ordinarily, of course, the opening of the switches will stop the motor and thus stop the upward movement of the elevating mechanism so that it is not necessary to open the valve 332, 334 unless and until it is desired to have the chair descend. If, however, a short circuit should suddenly develop in the wiring or something should go wrong with the switch mechanism or for some other reason the motor should continue to run, then the rod 364 would be pulled upwardly a slight additional extent beyond the extent sufficient to tilt the switch platforms 250 and 252 to a switch-opening position. This additional upward movement of the rod 364 would then cause the lever 370 to press downwardly on the rod 354 and open the valve 332, 334, so that even if operation of the pump continues, the liquid delivered by the pump can immediately escape or be by-passed through the valve 332, 334, to avoid further upward movement of the elevating mechanism and possible damage to the parts.

When this automatic cut-out mechanism first comes into play, the switches 220 and 222 are, of course, in the closed position shown in Fig. 15; or at least the switch 220 is closed, for otherwise the elevating mechanism would not be moving upwardly and the automatic cut-out would not come into play. The upward tilting of the switch platforms by the automatic cut-out mechanism shifts the platforms from the position shown in Fig. 15 to the position shown in Fig. 16, which latter figure illustrates the automatic cut-out mechanism operated not only to the extent necessary to open the switches, but also to the further extent required to open the valve 332, 334.

The invention thus provides a duplex automatic control for stopping upward movement of the elevating mechanism, even if the chair operator does not notice the extent of elevation and keeps his foot on the elevating pedal 268. The automatic control first opens the motor switches, and then, if this does not stop the upward movement of the mechanism, opens also the valve 332, 334 to permit the liquid to escape from the pressure system as rapidly as it is forced into the system by the pump. Even though the elevating pedal 266, 268 remains depressed, this does not interfere in any way with the opening of the motor switches by the automatic control, since depression of the pedal does not positively close the switches but merely closes them resiliently, withdrawing the support 270 so that the springs 276 and 278 may close the switches.

A metering valve is provided in association with the valve seat 324 (Figs. 8 and 10) to control the maximum rate of discharge of liquid when the valve 332, 334 is open, and also to bring the chair to a smooth rest at the end of the downward descent. This metering valve comprises a valve stem member 400 mounted for longitudinal movement in the vertical bore 322, and having a frusto-conical lower end 402 constituting the valve portion for cooperation with the seat 324. The upper part of the stem 400 is hollow, and has at its upper end an outwardly extending flange 404, against the bottom of which presses a coiled spring 406 constantly tending to move the valve upwardly to an open position. A rod 408 has its lower end placed in the hollow bore in the upper part of the valve stem 400, and serves to limit the upward movement of the valve under the influence of the spring 406.

The upper end of the rod 408 is threaded as at 410 and screwed into a suitable partition, lug, or ear 412 forming part of the chair base 32. By turning the rod 408 with a screw driver, a fine adjustment of the elevation of the lower end of the rod may be attained, thus adjusting the maximum open position of the valve 402 in order to meter or throttle down the maximum rate of flow of the liquid through the passageways 302 and 318 back to the liquid reservoir, when the lowering valve 332, 334 is open. The metering valve 402 thus serves to limit or define the maximum speed at which the chair may descend, and the valve is adjusted to hold the speed of descent within a rate which will not be objectionable to the person sitting in the chair.

The valve 402 performs also a second important function, namely, the bringing of the chair to a smooth stop when it reaches its lowermost position. A lug 416 is provided on the outer telescoping or sleeve member 40, this lug having a portion loosely surrounding the rod 408. The lug 416 is placed at such an elevation on the telescoping member 40 with respect to the elevation of the top of the valve stem 400, that as the chair comes down, the lug 416 will come into contact with and press downwardly upon the top of the valve stem 400 just as the chair is about to reach its lowermost position. As the descent continues, the valve stem 400 will be pushed downwardly against the influence of the spring 406, gradually closing the valve 402 slowly (due to the tapered or frusto-conical construction of the valve) and thus gradually reducing the rate of discharge of the liquid past the valve, until finally the liquid flow stops entirely and the elevating mechanism comes to a complete rest. This stopping of the descent by the metering valve 402 will occur, of course, only if the operator keeps the lowering pedal 340 depressed to keep the valve 332, 334 open. Whenever the operator removes his foot from the lowering pedal 340 and allows the valve 332, 334 to close, at any point before the chair has descended fully to its lowermost position, the closing of the valve 332, 334 will stop further descent of the chair.

The metering valve 402 performs a further important function, in that it promotes smooth starting of the next upward movement of the chair after a complete downward movement. If the metering valve were not provided, and if the operator kept his foot on the lower pedal 340 for a moment after the chair reached the bottom of its descent, liquid would continue to escape through the open valve 332, 334, even after the chair had reached its lowest position, with the result that the pressure within the air bell 170 would be discharged, and the liquid level might even fall within the passageway 114 in the standpipe 102. Then upon starting the motor and pump for the next upward movement of the chair, liquid would first have to be pumped into the air bell 170 to build up the required pressure therein, and also into the duct 114 to refill this duct if the liquid level had fallen therein, before the chair began to rise. This would cause an undesirable delay or lag in the upward movement of the chair. Also, during this delay, the dashpot controlled switch 222 might have had time to operate, so that the pump would be operating at full speed at the time that the liquid pressure finally began to move the chair upwardly. This would start the chair with a sudden jolt or jar, distasteful to the occupant.

The use of the valve 402 avoids any such sudden starting as this, for when the chair reaches its lowermost position the valve 402 is completely closed automatically by the portion 416 of the sleeve 40, and even if the operator keeps his foot on the lowering pedal 340, no further liquid can escape from the passageway 302, and the pressure previously built up in the bell 170 cannot be discharged therefrom. Therefore, when the motor is started, no preliminary building up of pressure in the bell 170 or in the liquid passageways is required, and the chair begins to rise as soon as the pump begins to operate, the start of the upward movement being smooth and even because of the initial slow speed of the pump, followed later by the higher speed operation thereof when the switch 222 is closed.

The importance of the use of the two separate check valves 180 and 182 may also be mentioned at this point. The use of these two valves in series with each other gives improved results over the use of either valve alone. In extensible chairs of this kind, particularly where used for dental work, the person sitting in the chair is likely occasionally to rise partially from his seat and then come down suddenly upon the seat again, due for example, to a sudden twinge of pain. This sudden downward impact upon the seat increases momentarily the liquid pressure within the cylinder 104. If the check valve 182 at the bottom of the standpipe 102 were omitted, and only the check valve 180 were employed, then the momentary pressure increases in the liquid in the cylinder 104 would be transmitted back through the passageway 100 and the flexible hose connection 178, to the air bell 170. The increased pressure of the liquid would compress the air in the top of the bell 170 to a greater extent, allowing additional liquid to flow into the bell, thus allowing a slight lowering of the chair seat momentarily. Then the increased pressure of air in the bell 170 would tend to expel liquid from the bell and force it back through the hose 178 and duct 100 into the cylinder 104, raising the chair again to the initial elevation which it occupied prior to the downward impact of the occupant's body. This slight upward and downward movement of the chair would be highly undesirable to many persons sitting in the chair, and should be avoided. Likewise, the sudden pressure increases in the liquid, due to a sudden downward impact of the person's body on the chair seat, would subject the liquid within the flexible hose 178 to a greater than normal pressure, which might possibly split or damage the hose, which is of less strength than the metal parts 100, 102, etc.

The provision of the check valve 182 at the lower end of the standpipe 102 obviates all these possible difficulties, for it prevents any back pressure in the passageway 100, hose 178, or air bell 170 no matter how much the pressure may increase in the cylinder 104.

On the other hand, if the check valve 180 were omitted and only the valve 182 were employed, this arrangement also would have serious objections. The pump would then be in direct communication with the air bell 170, and when the pump was not operating, the pressure in the air bell would be discharged backwardly through the pump, since the pump necessarily has small working clearances so that it does not form an absolutely tight seal when it is stationary. This discharge of pressure from the air bell, caused by seepage backwardly through the pump, would have the same undesirable effect above pointed out in connection with the avoidance of such discharge by means of the metering and cushioning valve 402. The use of the check valve 160 avoids any such discharge of pressure from the bell 170.

It should be noted that the raising and lowering pedals, the mercury switches, and the dashpot are all mounted upon the plate 240, and constitute a unitary assembly readily removable from the chair base by removing the mounting plate 240, so that the switches, pedals, and associated parts may be readily assembled, tested, serviced, or repaired in a convenient location and then be attached to the chair easily and quickly.

As already stated, the fluid pressure system for elevating the chair seat is preferably a liquid pressure system, and the liquid used is preferably but not necessarily oil. When the liquid is oil, the present invention provides for lubricating the main motor bearing 191 by means of the oil delivered by the pump. The lubricating arrangement is shown in Figs. 9, 21, and 22.

The member 440, on which the gear 138 is formed, is provided with an annular series of axial holes 442, one opposite each tooth space 148 (Fig. 9). The right hand ends (when viewed as in Fig. 21) of all of these holes 442 are covered and closed by the left hand ends of the teeth of the gear 142 during that part of each revolution of the pump gears in which these holes are moving from the discharge side of the pump back toward the inlet side thereof. As the holes 442 move from the inlet side to the discharge side, in the part of the revolution which builds up the pressure in the oil, the right hand ends of the holes are for a time covered and sealed by the left hand end of the fin 144, but just after each hole passes out from under the trailing edge of the fin 144, it is momentarily open and uncovered, so that some of the oil in and around the gears 138 and 142, now under pressure, may flow leftwardly through the holes 442.

Each hole 442 is alined with a similar hole 444, forming substantially a leftward continuation of the hole 442, in a ring 446 extending around a reduced shaft-like portion of the member 440, as shown in Figs. 21 and 22. A pin 448 in the member 440 has a head engaging a notch 450 in the ring 446 to hold this ring against rotary movement with respect to the member 440, so that the holes 444 are always held in exact alinement with the holes 442.

The oil under pressure, flowing leftwardly through the holes 442, partially flows through the holes 444 to the left hand edge or face of the member 446, and then flows radially inwardly through the joint between the left hand face of the ring 446 and the right hand end of a bushing 454 around the reduced portion of the member 440. Another part of the oil may flow radially inwardly through the joint between the right hand face of the ring 446 and the left hand face of the enlarged part of the member 440 which carries the gear 138. Thus, by one route or the other, the oil reaches the bearing surface 456 and flows leftwardly along this surface, lubricating it.

The oil continues leftwardly, and may accumulate to some extent in a cavity 460, and then continues further leftwardly along the bearing surface 462 between the motor shaft 191 and a surrounding stationary bushing. A wick 464 of absorbent material has one end bearing against the shaft 191 so that the wick collects and retains some oil, distributing this back to the shaft bearing as required in order to keep it properly lubricated.

The oil continues leftwardly to the left hand end of the bearing of the shaft 191, thence passes into an enlarged cavity 466, and down a passageway 468 to a tube or pipe 470 from which the oil is discharged back into the reservoir 130.

The flow of oil through this lubricating system when the pump is in operation, is relatively small, so that oil is discharged from the pipe 470 not as a continuous heavy stream, but merely as a slight trickle or as intermittent drops of oil. The flow is, however, sufficient to lubricate the bearings of the pump and the main motor bearing to an adequate extent, so that no other attention is required for lubricating these bearings.

As previously stated, the upper chair base section 32 is rotatably mounted on the lower stationary base section 30, so that the chair may be turned about a vertical axis when desired. It is advantageous to provide a lock to hold the chair against turning in any position in which it is set. This lock may conveniently be in the form of a frictional brake, as shown in Fig. 2. A brake shoe 480 is mounted on the inner surface of the base section 32 near the lower edge thereof, and has a portion extending downwardly to and lying against the inner side of the base section 30. This shoe 480 is threadedly engaged with threads 482 on the inner end of a short shaft 484 which extends downwardly through the base section 32 and is provided with an operating arm 486 conveniently accessible for operation either manually or, preferably, by the foot of the operator. By kicking the arm 486 in one direction with his foot, the operator turns the shaft 484 sufficiently far so that the threads 482 loosen the shoe 480 from the base section 30, unlock the chair so that it may be swung to the desired position. When the arm 486 is kicked in the opposite direction, the screw threads 482 clamp the shoe 480 tightly against the section 30, and thus hold the section 32 in stationary position with respect to the section 30, preventing rotation.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An extensible chair wherein there is a base, a chair seat mounted for upward and downward movement with respect to said base, an electric motor for moving said seat, and an electric circuit for supplying power to said motor, characterized by a resistance in said circuit, two switch-holding members mounted on said base for tilting movement, a main mercury tube switch mounted on one of said tilting members and connected in said circuit to control said circuit, a second mercury tube switch mounted on the other of said tilting members and connected across said resistance in parallel thereto to short circuit said resistance when said second switch is closed, spring means tending to move both of said tilting members to switch closing position, a movable control member normally holding both of said tilting members in switch opening position and shiftable to another position releasing said tilting members for movement to switch closing position under the influence of said spring means, and means for delaying switch closing movement of said tilting member on which said second switch is mounted with respect to the speed of switch closing movement of said tilting member on which said main switch is mounted.

2. An extensible chair wherein there is a base, a chair seat mounted for upward and downward movement with respect to said base, an electric motor for moving said seat, and an electric circuit for supplying power to said motor, characterized by a resistance in said circuit, two switch-holding members mounted on said base for tilting movement, a main mercury tube switch mounted on one of said tilting members and connected in said circuit to control said circuit, a second mercury tube switch mounted on the other of said tilting members and connected across said resistance in parallel thereto to short circuit said resistance when said second switch is closed, spring means tending to move both of said tilting members to switch closing position, a movable control member normally holding both of said tilting members in switch opening position and shiftable to another position releasing said tilting members for movement to switch closing position under the influence of said spring means, and means for moving at least one of said tilting members to switch opening position when said chair seat closely approaches the limit of its motion in one direction.

3. A construction according to claim 1, further including a mounting plate detachably secured to said base, said tilting members, switches, spring means, control member, and delaying means all being mounted on said mounting plate and constituting a unitary assembly readily applied to or detached from said base by applying said mounting plate to said base or detaching it therefrom.

4. An extensible chair wherein there is a base, a seat supporting part movable upwardly and downwardly with respect to said base, means including a liquid pressure cylinder for moving said part, pump means for providing liquid under pressure, inlet conduit means for conveying liquid under pressure from said pump means to said cylinder, and outlet means through which liquid may be discharged from said cylinder, characterized by two separate valves interposed in said outlet means to control flow of liquid therethrough, means for opening one of said valves at will, means constantly tending to open the other of said valves, adjustable stop means for limiting the extent to which said other valve may open, and means for automatically closing said other valve as said chair part substantially reaches the downward limit of a descending motion.

5. An extensible chair wherein there is a base, a seat supporting part movable upwardly and downwardly with respect to said base, means including a fluid pressure cylinder for moving said part, means for introducing fluid under pressure into said cylinder to raise said part, means forming a discharge passageway through which fluid may be discharged from said cylinder to lower said part, and a control valve interposed in said discharge passageway, characterized by means normally tending to hold said control valve in closed position, a cushioning valve also interposed in said passageway, means normally tending to hold said cushioning valve in open position, means for automatically opening said control valve as said part substantially reaches the upper limit of its motion, and means for automatically closing said cushioning valve as said part substantially reaches the lower limit of its motion.

6. An extensible chair wherein there is a base, a seat supporting part movable upwardly and downwardly with respect to said base, means including a liquid pressure cylinder for moving said part, motor driven pump means for supplying liquid under pressure, and conduit means connecting said pump means to said cylinder, characterized by an air bell operatively connected to said conduit means to damp pulsations in liquid pressure while said pump is operating, means forming a discharge passageway communicating both with said cylinder and with said air bell, a valve controlling flow of liquid through said discharge passageway, and means for automatically closing said valve when said part substantially reaches the limit of its motion in one direction, to prevent discharge of pressure built up within said air bell.

7. An extensible chair wherein there is a base, a seat supporting part movable upwardly and downwardly with respect to said base, means including a liquid pressure cylinder for moving said part with respect to said base, pump means for providing liquid under pressure, and conduit means leading from said pump means to said cylinder, characterized by an air bell connected to said conduit means intermediate said pump means and said cylinder to damp pulsations in liquid pressure while said pump means is in operation, a one-way check valve interposed in said conduit means between said pump means and said air bell to prevent escape of air bell pressure backwardly to and through said pump, and another one-way check valve interposed in said conduit means between said air bell and said cylinder to prevent increases of liquid pressure in said cylinder from being transmitted to said air bell.

8. A construction according to claim 7 in which said conduit means includes a flexible hose section between said air bell and said cylinder and in which said second one-way check valve is interposed in said conduit means at a point between said flexible hose section and said cylinder.

9. An extensible chair wherein there is a base having upstanding hollow walls and having an opening through one of said walls, a seat supporting part movable upwardly and downwardly with respect to said base, and fluid pressure means for moving said part, characterized by a power unit including an electric motor and a fluid pressure pump operatively connected to each other, said power unit being mounted upon said base and extending partially through said opening, and rubber cushioning means extending around the margin of said opening and interposed between said power unit and said base to reduce transmission of vibrations from said power unit to said base.

10. An extensible chair wherein there is a base having a stationary section and a rotatable section mounted on said stationary section to turn with respect to said stationary section about a substantially vertical axis, said rotatable section including a wall having an opening therein, a seat supporting part movable upwardly and downwardly with respect to said base, and fluid pressure means for moving said part, characterized by a power unit including an electric motor and a fluid pressure pump operatively connected to each other, said power unit extending partly through said opening and being mounted on said rotatable section of said base to swing integrally therewith when said rotatable section turns with respect to said stationary section, and cushioning means extending around the margin of said opening and serving to support said power unit from said base to reduce transmission of vibrations from said power unit to said base.

11. An extensible chair wherein there is a base including an upstanding wall having an opening therethrough, a seat supporting part movable upwardly and downwardly with respect to said base, and means including a fluid pressure cylinder for moving said part with respect to said base, characterized by a power unit including an electric motor and a fluid pressure pump operatively connected therewith, said power unit being mounted upon said base and extending partly through said opening, annular rubber cushioning means extending around the margin of said opening and interposed between said power unit and said base to reduce transmission of vibrations from said power unit to said base, and conduit means connecting said pump to said cylinder to deliver fluid from said pump to said cylinder, said conduit means including substantially rigid metallic sections separated from each other by a substantial distance and a flexible section interposed between and connecting said metallic sections to each other to reduce transmission of vibrations from said pump along said conduit means to said cylinder.

12. An extensible chair wherein there is a base having a stationary section and a rotatable section mounted on said stationary section to turn with respect to said stationary section about a substantially vertical axis, a seat supporting part mounted on said rotatable section for upward and downward movement with respect thereto, guide means for guiding upward and downward movement of said part, and means including a liquid pressure cylinder mounted on said rotatable section for moving said part, characterized by power driven pump means mounted on said rotatable section for introducing liquid into said cylinder to move said part, and reservoir means mounted on and turning bodily with said rotatable section for holding a supply of liquid to be pumped by said pump means into said cylinder, said reservoir means being in the form of an open top pan covering substantially the entire area of the bottom of said rotatable section of said base and being so placed that the bottom portion of said guide means may dip into liquid within said reservoir when said part is at the lower limit of its motion.

13. An extensible chair comprising a base having a stationary section and a rotatable section mounted on said stationary section to turn with respect thereto about a substantially vertical axis, said stationary section including a substantially horizontal trackway, a series of rollers rolling upon said trackway, said rotatable section including a substantially horizontal trackway resting upon said rollers and supported thereby, a floating ring having a series of pivot pins secured thereto, one extending into each roller to hold all of said rollers in proper spaced relation to each other, a seat supporting part mounted on said rotatable section for upward and downward movement with respect thereto, and power means mounted on said rotatable section for moving said part upwardly.

14. An extensible chair of the type including a base, a seat supporting part movable upwardly and downwardly with respect to said base, means including a liquid pressure cylinder for moving said part, motor driven pump means for supplying liquid under pressure, and conduit means connecting said pump means to said cylinder, characterized by an air bell operatively connected to said conduit means, means forming a discharge passageway communicating with said conduit means between said pump means and said cylinder, a one-way check valve interposed in said conduit means between said pump means and said air bell to prevent escape of air bell pressure backwardly to and through said pump means, a valve controlling flow of liquid through said discharge passageway, and means for automatically closing said valve when said seat supporting part substantially reaches the lower limit of its motion, to prevent escape of air bell pressure through said discharge passageway.

15. An extensible chair of the type including a base, a seat supporting part movable upwardly and downwardly with respect to said base, a liquid pressure cylinder operatively connected to said part to move it, a motor driven liquid pump, and a conduit connecting said pump to said cylinder for introducing into said cylinder liquid pumped by said pump, characterized by an air bell operatively connected to said conduit between said pump and said cylinder, an outflow branch leading from said conduit between said pump and said cylinder, valve means in said outflow branch to control flow of liquid therethrough during descent of said seat supporting part, means including a pedal for opening said valve means to allow escape of liquid to cause descent of said seat supporting part from an elevated position, and means operated by movement of said seat supporting part for closing said valve means independently of movement of said pedal, as said seat supporting part reaches the lower limit of its travel, to stop flow of liquid through said outflow branch and to retain pressure within said air bell against discharge thereof through said outflow branch.

16. An extensible chair of the type including a base, a seat supporting part movable upwardly and downwardly with respect to said base, a liquid pressure cylinder operatively connected to said part to move it, a motor driven liquid pump, and a conduit connecting said pump to said cylinder for introducing into said cylinder liquid pumped by said pump, characterized by an air bell operatively connected to said conduit between said pump and said cylinder, an outflow branch leading from said conduit between said pump and said cylinder, two separate valves in said outflow branch in series with each other, a spring normally holding one of said valves closed, pedal means for opening said one of said valves to permit escape of liquid through said branch to cause descent of said seat supporting part from an elevated position, a spring normally holding the other of said valves open, and means operated automatically by movement of said seat supporting part for closing said other of said valves as said seat supporting part reaches the lower limit of its travel, to stop flow of liquid through said outflow branch and to retain pressure within said air bell against discharge thereof through said outflow branch.

CHARLES R. MEITZLER.